United States Patent
Vishwakarma et al.

(10) Patent No.: US 12,164,278 B2
(45) Date of Patent: Dec. 10, 2024

(54) SYSTEMS AND METHODS FOR DEVICE THERMAL MANAGEMENT USING DYNAMIC RANKING OF DEVICE COOLING NEEDS

(71) Applicant: EMC IP Holding Company LLC, Hopkinton, MA (US)

(72) Inventors: Rahul Deo Vishwakarma, Bangalore (IN); Hemant Gaikwad, Bangalore (IN); Ashish Singh, Uttar Pradesh (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1067 days.

(21) Appl. No.: 17/092,812

(22) Filed: Nov. 9, 2020

(65) Prior Publication Data

US 2022/0147016 A1 May 12, 2022

(51) Int. Cl.
*G06N 20/20* (2019.01)
*G05B 19/406* (2006.01)
*G05B 19/4155* (2006.01)

(52) U.S. Cl.
CPC ....... *G05B 19/4155* (2013.01); *G05B 19/406* (2013.01); *G06N 20/20* (2019.01); *G05B 2219/49216* (2013.01)

(58) Field of Classification Search
CPC .............. G05B 19/4155; G05B 19/406; G05B 2219/49216; G06N 20/20; G06N 5/01; G06F 11/3065; G06F 11/3058; G06F 11/3006
See application file for complete search history.

(56) References Cited

U.S. PATENT DOCUMENTS

| | | | |
|---|---|---|---|
| 10,048,996 B1 * | 8/2018 | Bell | G06F 11/3006 |
| 2015/0113303 A1 * | 4/2015 | Jung | G06F 1/3296 |
| | | | 713/320 |
| 2017/0353873 A1 * | 12/2017 | Aksela | H04B 7/18506 |

(Continued)

OTHER PUBLICATIONS

Cherubin, Giovanni, Adrian Baldwin, and Jonathan Griffin. "Exchangeability martingales for selecting features in anomaly detection." Conformal and Probabilistic Prediction and Applications. PMLR,. (Year: 2018).*

(Continued)

*Primary Examiner* — John T Repsher, III
(74) *Attorney, Agent, or Firm* — Chamberlain, Hrdlicka, White, Williams & Aughtry; Aly Dossa (57) ABSTRACT

Techniques described herein relate to methods and systems for thermal management of a thermal environment. The method may include using thermal data items from computing devices and time series analysis to predict future thermal values for the thermal data items; performing a clustering analysis using the predicted future thermal values to assign cluster labels to the computing devices; using the cluster labels and the predicted future thermal values to assign predicted thermal status labels to the computing devices; assigning a confidence value to the predicted thermal status labels and ranking the computing devices based on the confidence values; performing an analysis to determine a thermal data item contributing to the assigned thermal status; and sending the results to a thermal environment administrator.

18 Claims, 4 Drawing Sheets

(56) References Cited

U.S. PATENT DOCUMENTS

2020/0379529 A1\* 12/2020 Le Goff ................. G01K 1/022
2022/0087075 A1\* 3/2022 Heydari ................... G06N 3/08

OTHER PUBLICATIONS

Lakshminarayanan, Balaji, Daniel M. Roy, and Yee Whye Teh. "Mondrian forests: Efficient online random forests." Advances in neural information processing systems 27. (Year: 2014).\*

Proedrou, Kostas, et al. "Transductive confidence machines for pattern recognition." Machine Learning: ECML 2002: 13th European Conference on Machine Learning Helsinki, Finland, Aug. 19-23, 2002 Proceedings 13. Springer Berlin Heidelberg. (Year: 2002).\*

\* cited by examiner

SYSTEMS AND METHODS FOR DEVICE THERMAL MANAGEMENT USING DYNAMIC RANKING OF DEVICE COOLING NEEDS

BACKGROUND

Computing devices often exist in environments that include many such devices (e.g., servers, virtualization environments, storage devices, network devices, etc.) such as, for example, a data center. Such devices have any number of components (e.g., processors, input-output components, controller components, storage mediums, memory, system busses, etc.) The components each use power and, thus, generate heat. As such, they must be cooled to ensure proper operation of the device including the components. However, temperature of components and devices is dependent on a variety of factors, such as what workloads they are executing, where they are located in a data center, local temperatures, how high they are in a rack of such devices (because hot air rises), etc. However, understanding and predicting device temperatures on a per-device level may not be available to entities tasked with effective thermal management of such an environment. Also, understanding and predicting why such temperatures have and may occur may not be available such.

SUMMARY

In general, embodiments described herein relate to a method for thermal management of a thermal environment. The method may include obtaining a plurality of thermal data items associated with a plurality of computing devices in the thermal environment; writing a plurality of entries in a time series database, the plurality of entries comprising the plurality of thermal data items; performing a time series analysis to predict a plurality of predicted future thermal values based on the plurality of entries in the time series database; performing a clustering analysis to apply a first cluster label to a first portion of the plurality of computing devices and a second cluster label to a second portion of the plurality of computing devices; and performing a thermal prediction analysis using the first cluster label, the second cluster label, and the plurality of predicted future thermal values to assign a thermal status label to each of the plurality of computing devices. The thermal status label may high or low. The method may also include performing a confidence analysis to determine a confidence value for the thermal status label assigned to each of the plurality of computing devices; ranking the plurality of computing devices based on the confidence analysis to obtain a ranked thermal status list; performing a cause analysis to determine at least one thermal data item contributing to each thermal status label assigned to the plurality of computing devices; and providing the ranked thermal status list and results of the cause analysis to an administrator of the thermal environment.

In general, embodiments described herein relate to a non-transitory computer readable medium that includes computer readable program code, which when executed by a computer processor enables the computer processor to perform a method for thermal management of a thermal environment. The method may include obtaining a plurality of thermal data items associated with a plurality of computing devices in the thermal environment; writing a plurality of entries in a time series database, the plurality of entries comprising the plurality of thermal data items; performing a time series analysis to predict a plurality of predicted future thermal values based on the plurality of entries in the time series database; performing a clustering analysis to apply a first cluster label to a first portion of the plurality of computing devices and a second cluster label to a second portion of the plurality of computing devices; and performing a thermal prediction analysis using the first cluster label, the second cluster label, and the plurality of predicted future thermal values to assign a thermal status label to each of the plurality of computing devices. The thermal status label may high or low. The method may also include performing a confidence analysis to determine a confidence value for the thermal status label assigned to each of the plurality of computing devices; ranking the plurality of computing devices based on the confidence analysis to obtain a ranked thermal status list; performing a cause analysis to determine at least one thermal data item contributing to each thermal status label assigned to the plurality of computing devices; and providing the ranked thermal status list and results of the cause analysis to an administrator of the thermal environment.

In general, embodiments described herein relate to a system for thermal management of a thermal environment. The system may include a thermal data collector, comprising circuitry, and configured to obtain a plurality of thermal data items associated with a plurality of computing devices in the thermal environment; and write a plurality of entries in a time series database, the plurality of entries comprising the plurality of thermal data items. The system may also include a thermal forecaster, comprising circuitry, and configured to perform a time series analysis to predict a plurality of predicted future thermal values based on the plurality of entries in the time series database. The system may also include a cluster generator, comprising circuitry, and configured to perform a clustering analysis to apply a first cluster label to a first portion of the plurality of computing devices and a second cluster label to a second portion of the plurality of computing devices. The system may also include a status predictor, comprising circuitry, and configured to perform a thermal prediction analysis using the first cluster label, the second cluster label, and the plurality of predicted future thermal values to assign a thermal status label to each of the plurality of computing devices. The thermal status label may high or low. The system may also include a confidence analyzer, comprising circuitry, and configured to perform a confidence analysis to determine a confidence value for the thermal status label assigned to each of the plurality of computing devices. The system may also include a parameter predictor, comprising circuitry, and configured to perform a cause analysis to determine at least one thermal data item contributing to each thermal status label assigned to the plurality of computing devices. The system may also include a thermal results analysis transmitter, comprising circuitry, and configured to rank the plurality of computing devices based on the confidence analysis to obtain a ranked thermal status list; and provide the ranked thermal status list and results of the cause analysis to an administrator of the thermal environment.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects

DETAILED DESCRIPTION

Specific embodiments will now be described with reference to the accompanying figures.

In the below description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for predicting future thermal conditions for computing devices, determining a confidence level of such predictions, ranking the predictions based on the confidence levels, and determining certain variables that are likely to be contributing factors in the future thermal conditions. In one or more embodiments, the results of the aforementioned thermal analysis may be provided to one or more entities tasked with managing one or more thermal environments (e.g., a data center)

Overall device temperature for computing devices (e.g., in a data center) have generally been increasing over time due, at least in part, to advancements that include, but are not limited to, component computing density, multi-core processors, multi-processors devices, hyper-threading, complex and dense architectures, hyper-scale storage devices, multiple redundant controllers of various types, multiple component connection interfaces per device, etc. However, for data center compute, storage, networking, converged, and/or hyper-converged devices, as well for the data center as a whole, power and thermal management policies are often static and set manually. Said another way, the cooling and thermal management for most of the devices is often generic and agnostic of the workloads running on the devices, even where such workloads are critical or heavy workloads.

For the data center as a whole, a relatively constant cooling (e.g., air conditioning, liquid cooling, etc.) is often provided, while individual computing devices often include fans to locally cool the computing device components by adjusting fan speed as required. Increasing fan speed, however, may result in higher power consumption. Moreover, each computing device in a data center is often cooled via centrally conditioned air at a (relatively) constant set temperature without regard for the actual heat being dissipated by the computing devices and/or components therein.

In one or more embodiments, computing devices heating at a higher rate than the cooling solution being implemented in a data center negatively impacts the device performance. Specifically, computing device components such as processors, memory, storage components, network components, etc. may under-perform due to high temperatures. Moreover, within the data center racks holding computing devices, devices higher in the rack may end up being subjected to more heat when compared to the computing devices located lower in the rack, as hot air tends to propagate upward. Additionally, the inlet and outlet temperature control is often difficult to achieve. Such inefficient thermal management may increase costs and may also reduce computing device availability to effectively perform intended operations.

In one or more embodiments, overcooling is another problem for data center computing devices, as overcooling also increases overall power consumption which may, for example, increase data center cooling costs, especially when all devices are provided the same amount of cooling regardless of whether any particular computing device requires the level of cooling being provided.

In one or more embodiments, improved thermal management of devices in a data center is achieved via providing the ability to implement context-aware cooling per device or groups of devices in a data center. In one or more embodiments, such improved thermal management is achieved using thermal data obtained from sensors of components of computing devices to predict future thermal values, classify the computing devices as high temperature and/or low temperature based on the predicted thermal values, predict which components may be contributing to the assigned classification status, and determine a confidence level of the predicted thermal status of the computing device. In one or more embodiments, based on the predicted confidence of the prediction, the thermal predictions may be ranked. In one or more embodiments, such rankings, along with possible components causing the predicted thermal status, are provided to relevant entities (e.g., data center administrators), thereby allowing such entities to take actions to address possible sub-optimal thermal conditions for computing devices in a data center. Examples of such actions may include, but are not limited to, moving computing devices from known warmer to known cooler locations in the data center, adjusting the placement of computing devices in a given rack, re-assigning workloads that may be contributing to increased temperatures, providing additional cooling solutions for devices, racks, etc. that are predicted to continue to experience high temperatures, etc.

Figure 1A:
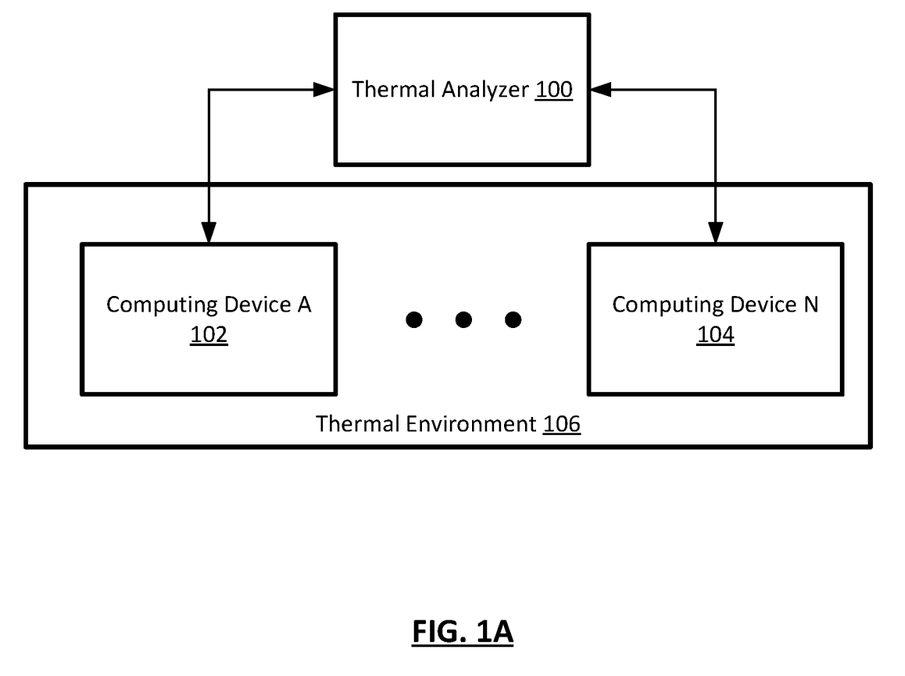
FIG. 1A shows a diagram of a system in accordance with one or more embodiments of the invention.

FIG. 1A shows a diagram of a system in accordance with one or more embodiments described herein. The system may include a thermal analyzer (100) operatively connected to any number of computing devices (e.g., computing device A (102), computing device N (104)) in a thermal environment (106). Each of these components is described below.

In one or more embodiments, the computing devices (102, 104) may be computing devices of any type located in a common thermal environment (106), such as a data center. In one or more embodiments, a thermal environment (106) is any environment in which any number of computing devices, such as computing device A (102) and computing device N (104), are subject, at least in part, to a shared scheme for thermal management. For example, a data center may have a set of air conditioning units (and/or heaters) and liquid cooling apparatuses that work together to control the temperature within the data center.

In one or more embodiments, the computing devices (102, 104) within the thermal environment (106) may be any single computing device, collection of computing devices, portion of one or more computing devices, or any other logical grouping of computing resources (e.g., a hyperconverged infrastructure).

In one or more embodiments, a computing device is any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements.

In one or more embodiments, any or all of the aforementioned examples may be combined to create a system of such devices, which may collectively be referred to as a computing device (102, 104) (e.g., a set of blade servers in a blade server rack). Other types of computing devices may be used without departing from the scope of the embodiments described herein.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, computing devices (102, 104) in a thermal environment (106) may have any number of components and sensors (not shown) that produce thermal data items (e.g., temperature readings). Such thermal data items may include, but are not limited to: processor temperature; memory temperature; storage disk temperature, network component temperature; application specific integrated circuit (ASIC) temperature; field programmable gate array (FPGA) temperature; voltage data; current data; power consumption data; ambient temperature data; chassis temperature; inlet temperatures; exhaust temperatures; minimum and maximum temperatures for any component; optical component temperatures; storage controller temperatures; network controller temperatures; alternating current (AC) input information; direct current (DC) input information; fan speed information; fan power consumption information; temperature and power information for various sub-systems; airflow information; etc. One of ordinary skill in the art will appreciate that other types of information may be used as thermal data items without departing from the scope of embodiments described herein.

In one or more embodiments, the system also includes a thermal analyzer (100). The thermal analyzer (100) may be included in the same thermal environment (106) as the computing devices (102, 104). Alternatively, as shown in FIG. 1, the thermal analyzer (100) may be located outside of the thermal environment (106).

In one or more embodiments, the thermal analyzer (100) is operatively connected to the computing devices (102, 104). A thermal analyzer (100) may be separate from and connected to any number of computing devices (102, 104), or may be a part of one or more of the computing devices of the thermal environment (106). In one or more embodiments, the thermal analyzer (100) is a computing device.

In one or more embodiments, a computing device is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., SSDs, HDDs (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fibre/fiber channel storage device, an iSCSI storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device. Other types of computing devices may be used without departing from the scope of the invention.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

The thermal analyzer (100), and components therein, are discussed further in the description of FIG. 1B, below.

In one or more embodiments, the computing devices (102, 104) and the thermal analyzer (100) are operatively connected via a network (not shown). A network may refer to an entire network or any portion thereof (e.g., a logical portion of the devices within a topology of devices). A network may include a data center network, a wide area network, a local area network, a wireless network, a cellular phone network, or any other suitable network that facilitates the exchange of information from one part of the network to another. A network may be located at a single physical location, or be distributed at any number of physical sites. In one or more embodiments, a network may be coupled with or overlap, at least in part, with the Internet.

While FIG. 1A shows a configuration of components, other configurations may be used without departing from the scope of embodiments described herein. Accordingly, embodiments disclosed herein should not be limited to the configuration of components shown in FIG. 1A.

Figure 1B:
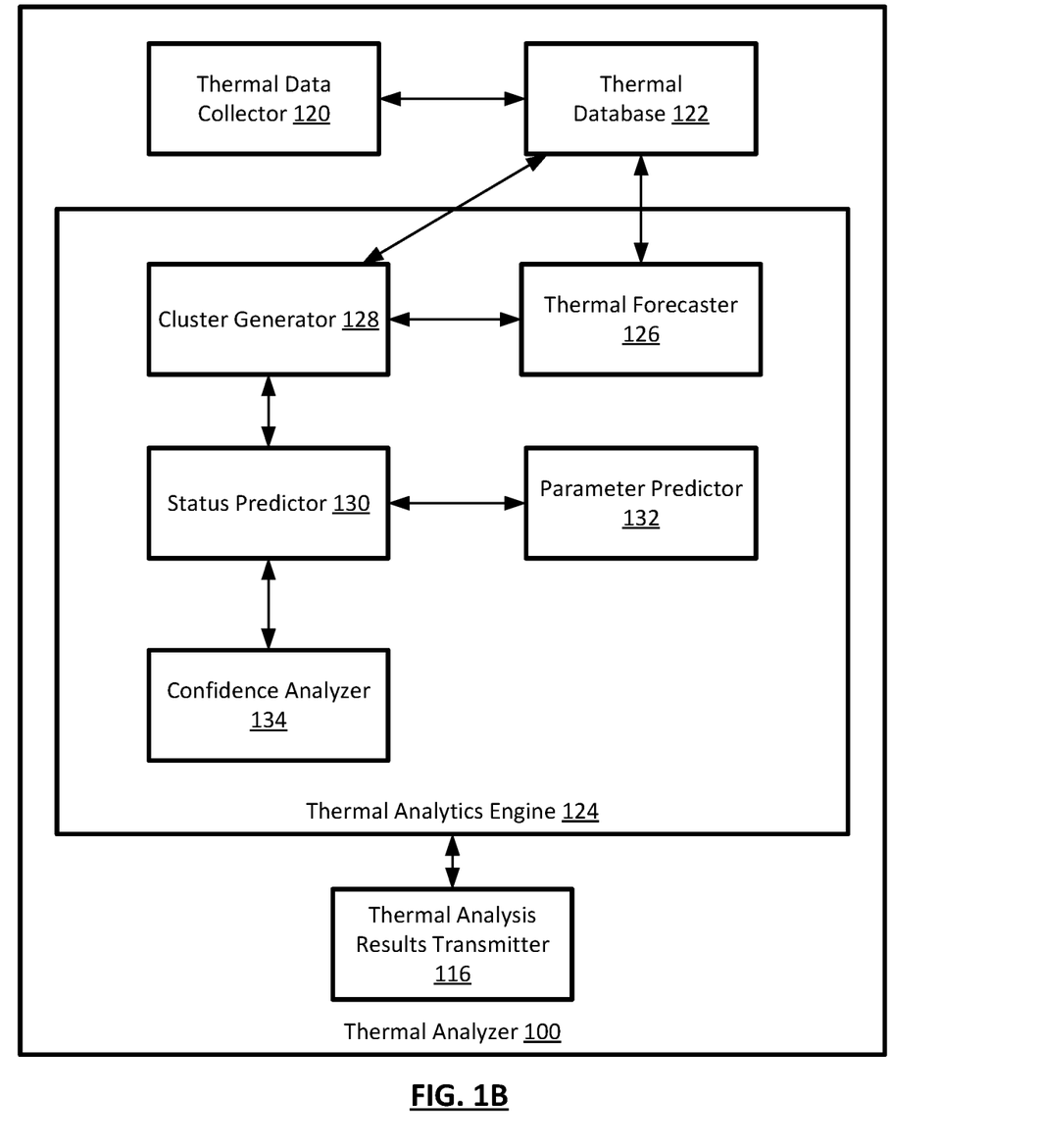
FIG. 1B shows a diagram of a thermal analyzer in accordance with one or more embodiments of the invention.

FIG. 1B shows a diagram of a thermal analyzer (100) in accordance with one or more embodiments described herein. The thermal analyzer (200) may include a thermal data collector (120), a thermal database (122), a thermal analysis results transmitter (116), and a thermal analytics engine (124). The thermal analytics engine (124) may include a cluster generator (128), a thermal forecaster (126), a status predictor (130), a confidence analyzer (134), and a parameter predictor (132). Each of these components is described below.

In one or more embodiments, the thermal analyzer (100), as discussed above in the description of FIG. 1A, is a computing device, which may be located within or be external to a thermal environment (106) that includes computing devices (102, 104) for which the thermal analyzer (100) is performing thermal analysis.

In one or more embodiments, a thermal data collector (120) is any hardware (e.g., circuitry), software, firmware, or any combination thereof that includes functionality to obtain thermal data items (discussed above in the description of FIG. 1) of computing devices in a thermal environment. In one or more embodiments, the thermal data collector (120) obtains the thermal data items via a network interface (not shown) of the thermal analyzer (100). As an example, a thermal data collector (120) may be one or more processes executing on one or more processors (including circuitry therein) of the thermal analyzer (100) to obtain and store thermal data items.

In one or more embodiments, the thermal analyzer (100) also includes a thermal database (122) operatively connected to the thermal data collector (120). In one or more embodiments, a thermal database (122) is a data repository. In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, a thermal database (122) is a database that records entries as a series of sets of data items associated with a thermal data items of a given computing device at a given time. For example, for each computing device in the thermal environment, the thermal database (122) may include a set of types of thermal data items obtained from the device, and the value for each of the thermal data items at a series of times in the past (e.g., 10 minutes ago, 5 minutes ago, now . . . ). Such per-device thermal data item information may be organized in any manner, such as in separate tables, aggregated into a single table, etc.

In one or more embodiments, the thermal analyzer (100) includes a thermal analytics engine (124). In one or more embodiments, a thermal analytics engine (124) is any hardware (e.g., circuitry), software, firmware, or any combination thereof that includes functionality to analyze thermal data items (discussed above in the description of FIG. 1) associated with computing devices in a thermal environment. For example, a thermal analytics engine (124) may be one or more processes executing on one or more processors of the thermal analyzer (100). In one or more embodiments, the thermal analytics engine (124) includes functionality to assess thermal conditions for computing devices based on the aforementioned thermal data items to make a prediction of future thermal conditions, assign a confidence to the predictions, rank the predictions based on the a confidence analysis, and determine what thermal data items (i.e., variables) may contribute to the future thermal conditions for computing devices in the thermal environment.

In one or more embodiments, the thermal analytics engine (124) includes a thermal forecaster (126). In one or more embodiments, the thermal forecaster (126) is operatively connected to the thermal database (122). In one or more embodiments, the thermal forecaster (126) is any hardware (e.g., circuitry), software, firmware, or any combination thereof that includes functionality to perform an analysis on a time series data set of thermal data items to produce forecasted future thermal values.

In one or more embodiments, the thermal forecaster (126) uses a Fourier time series analysis to predict (i.e., forecast) the next n-step ahead set of thermal data item values for the computing devices in the thermal environment. The analysis may generate any number of predicted thermal data item value sets for any number of computing devices at any number of future times. In one or more embodiments, the thermal forecaster (126) stores the values generated by the Fourier time series analysis in the thermal database (122).

In one or more embodiments, the thermal analytics engine (124) includes a cluster generator (128). In one or more embodiments, the cluster generator (128) is operatively connected to the thermal database (122). In one or more embodiments, the cluster generator is any hardware (e.g., circuitry), software, firmware, or any combination thereof that includes functionality to use the forecasted future values (e.g., from the thermal forecaster (126)) to generate two clusters (e.g., labeled C1 and C2) from the forecasted future data set.

In one or more embodiments, the cluster manager (128) includes functionality to generate clusters using the thermal data item predicted values for the computing devices. In one or more embodiments, the cluster manager (128) is configured to organize the data to create two clusters (e.g., C1 and C2). In one or more embodiments, the cluster manager (128) uses a clustering algorithm such as a Hierarchical Density-Based Spatial Clustering of Applications with Noise (HDBSCAN). In one or more embodiments, HDBSCAN uses the data to assess the density relationships present in the data, using techniques such as, for example, a nearest neighbor analysis, defining a mutual reachability distance, building minimum spanning trees using an appropriate algorithm, building a hierarchy of cluster with minimum cluster sizes, and then assigning a cluster label to the computing devices for which predicted thermal data items were used as the data set by the cluster generator (128). One of ordinary skill in the art will appreciate that any other clustering analysis algorithm may be used without departing from the scope of embodiments described herein.

In one or more embodiments, the thermal analytics engine (124) also includes a status predictor (130). In one or more embodiments, a status predictor (130) is any hardware (e.g., circuitry), software, firmware, or any combination thereof that includes functionality to use the aforementioned cluster labels created from the data items obtained by the thermal data collector (120) and stored in the thermal database (122) to predict future thermal statuses (e.g., temperature will be HIGH or LOW relative to a threshold) for computing devices in the thermal environment. In one or more embodiments, the status predictor uses any machine learning algorithm to make the prediction. For example, a Mondrian forest classifier, a nearest neighbor algorithm, etc. may be used to make the status prediction. Such a prediction may be made, for example, by comparing the predicted future thermal data items associated with a given computing device, along with the cluster label assigned for the computing device to known thermal data item sets for computing devices to predict the future thermal status for the computing device. In one or more embodiments, one or more thresholds are defined that are used to determine whether a status label assigned to a computing device should be HIGH (i.e., high temperature) or LOW (i.e., low temperature).

In one or more embodiments, the thermal analytics engine (124) also includes a confidence analyzer (134). In one or more embodiments, a confidence analyzer (134) is any hardware (e.g., circuitry), software, firmware, or any combination thereof that includes functionality to use the aforementioned data items obtained by thermal data collector (120) and stored in the time series database (208), along with the predictions of future thermal status made by the status predictor (130), to assign a confidence value to the prediction of status. In one or more embodiments, the confidence analyzer (134) uses a transductive confidence machine to assign a confidence to each prediction. Such confidence may be assigned, for example, by calculating a non-conformity score relative to possible status predictions, using the non-conformity scores to determine uncertainty values (e.g., p-values), and using the uncertainty values to determine credibility and, ultimately, confidence values for each prediction In one or more embodiments, the thermal analytics engine (124) also includes a parameter predictor (132). In one or more embodiments, a parameter predictor (132) is any hardware (e.g., circuitry), software, firmware, or any combination thereof that includes functionality to use the aforementioned thermal data items obtained by thermal data collector (120) and stored in the thermal database (122), along with the predictions of future thermal status made by the status predictor (130), to determine which parameters (i.e., thermal data items) associated with a given computing device may contribute to the future predicted thermal status. Such a determination may be made, for example, using an exchangeability test to determine a variation for a given thermal data item between the values of the thermal data item in the thermal database (122). In one or more embodiments, the exchangeability test is performed using martingales. In one or more embodiments, use of martingales determines if a value in a sequence of values varies from the expectation of its value based on prior values for a data item.

In one or more embodiments, the thermal analyzer (100) also includes a thermal analysis results transmitter (116). In one or more embodiments, a thermal analysis results transmitter (116) is any hardware (e.g., circuitry), software, firmware, or any combination thereof that includes functionality to receive the results of the analyses performed by the thermal analytics engine (124), and to organize such results into a data structure. For example, the data structure may be a table that includes a computing device identifier, a predicted future thermal status for the computing device, a confidence parameter regarding how likely it is that the prediction is correct, and a listing of variables that may contribute to the predicted future thermal status of a computing device.

In one or more embodiments, the listing of predicted future thermal statuses is ranked, with the computing devices having the highest confidence value being highest the remaining computing devices being ranked in a descending manner thereafter. In one or more embodiments, there is a separate ranking of computing devices predicted to be at a high temperature (e.g., over a temperature threshold) and computing devices predicted to be at a low temperature (e.g., below a temperature threshold).

In one or more embodiments, the thermal analysis results transmitter (116) also includes functionality to take the data structure created, and provide the results therein to an interested entity (e.g., an administrator, a software application performing further analysis of possible thermal management actions, etc.). For example, the thermal analysis results transmitter (116) may be in communication with a computing device (not shown) that is configured to display, via a GUI, the results to a thermal environment administrator.

While FIG. 1B shows a configuration of components, other configurations may be used without departing from the scope of embodiments described herein. Accordingly, embodiments disclosed herein should not be limited to the configuration of components shown in FIG. 1B.

Figure 2:
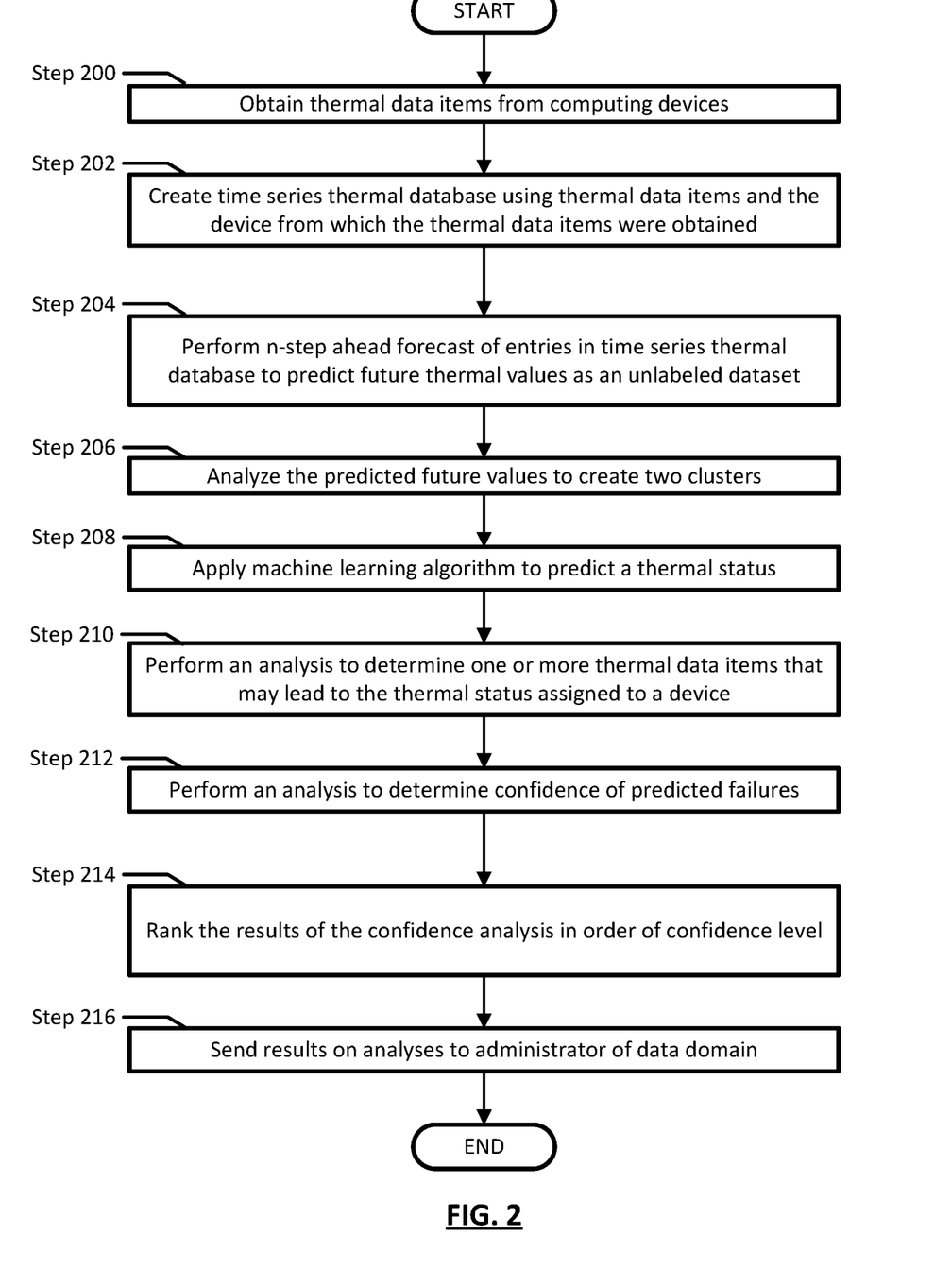
FIG. 2 shows a flowchart in accordance with one or more embodiments of the invention.

FIG. 2 shows a flowchart describing a method for thermal management in accordance with one or more embodiments disclosed herein.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, thermal data items associated with computing devices in a thermal environment are obtained. In one or more embodiments, any number of sets of such data items may be obtained, each associated with a respective computing device. As discussed above in the description of FIG. 1A, such thermal data items may include, but are not limited to: processor temperature; memory temperature; storage disk temperature, network component temperature; application specific integrated circuit (ASIC) temperature; field programmable gate array (FPGA) temperature; voltage data; current data; power consumption data; ambient temperature data; chassis temperature; inlet temperatures; exhaust temperatures; minimum and maximum temperatures for any component; optical component temperatures; storage controller temperatures; network controller temperatures; alternating current (AC) input information; direct current (DC) input information; fan speed information; fan power consumption information; temperature and power information for various sub-systems; airflow information; etc. One of ordinary skill in the art will appreciate that other types of information may be used as thermal data items without departing from the scope of embodiments described herein.

In one or more embodiments, such data items are obtained by a thermal data collector of a thermal analyzer. For example, thermal data items may arrive from computing devices at a network interface of a thermal analyzer, and a thermal data collector may obtain the data items via, at least in part, the network interface.

In Step 202, information (including data items) are stored in a time series thermal database. In one or more embodiments, series of thermal data items are timestamped when stored in the thermal database. As an example, thermal data items may be stored in the thermal database by the thermal data collector performing write operations to write the thermal data items to a storage medium.

In Step 204, an analysis is performed to determine predicted future values for thermal data items associated with the computing devices of the thermal environment. In one or more embodiments, a Fourier time series analysis is performed to obtain a next n-step ahead predicted value for the thermal data items. In one or more embodiments, predicting using time series analysis includes using past values of thermal data items to predict future values.

In Step 206, the predicted future thermal data item values generated in Step 204 are used to generate two clusters that are assigned as cluster labels to the computing devices of the thermal environment. In one or more embodiments, HDBSCAN is used to generate and apply the cluster labels to the computing devices. In one or more embodiments, HDBSCAN uses the thermal data items to assess the density relationships present in the data, using techniques such as, for example, a nearest neighbor analysis, defining a mutual reachability distance, building minimum spanning trees using an appropriate algorithm, building a hierarchy of cluster with minimum cluster sizes, and then assigning a cluster label to the computing devices for which predicted thermal data items were used as the data set. One of ordinary skill in the art will appreciate that any other clustering analysis algorithm may be used without departing from the scope of embodiments described herein.

In Step 208, an analysis is performed for to predict a future thermal status label for the computing devices of the thermal environment. Such an analysis may use any machine learning algorithm, which may use the thermal data items in the time series database as a training data set and the future predicted thermal values as the case that is being tested against that training set. One example of a machine learning algorithm that may be used in accordance with embodiments described herein is a Mondrian forest classifier. Other machine learning algorithms may be used without departing from the scope of embodiments described herein. In one or more embodiments, the results of an analysis of thermal data items is a prediction of whether, according to the machine learning algorithm, a computing device is predicted to be high temperature, or to be low temperature, at any one or more defined time(s) in the future.

In Step 210, an analysis is performed to determine which thermal data items associated with a computing device being analyzed are likely to contribute to the predicted future thermal status of the computing device. In one or more embodiments, such an analysis is an exchangeability test. Such a test may, for example, be performed using pluginmartingales. In such an analysis, each data item (i.e., variable) associated with a given future thermal status that is predicted is assessed against the historical set of such data items in the thermal database. In one or more embodiments, for a given data item, its value relative to the range of the data items in the thermal database is assessed. In one or more embodiments, if the data item is determined to vary from the set beyond a threshold value, which may be user defined, then the data item is considered to be a potential contributing factor to the predicted future thermal status of the computing device.

In Step 212, for the future thermal statuses predicted in Step 208, an analysis is performed to determine a confidence associated with the thermal status prediction. In one or more embodiments, any prediction confidence scheme may be used to determine the confidence level of a given prediction. One non-limiting example of such a scheme is a transductive confidence machine. In one or more embodiments, such a scheme assesses a future thermal status prediction against the information in the thermal database to determine that, for computing devices having similar sets of data items, whether the predicted thermal status was correct for similar sets of thermal data items. In one or more embodiments, if a confidence value assigned to a given prediction of thermal status is below a confidence threshold, then the prediction may be discarded prior to continuing to Step 214.

In Step 214, the predicted thermal statuses are ranked based on the confidence levels assigned in Step 212. For example, an assessment of ten computing devices that were predicted to have a high temperature in Step 208 yields a confidence level of each prediction. In one or more embodiments, the predicted thermal status having the highest confidence value is at the top of the ranking, with each subsequent entry in the ranking having a progressively lower confidence value.

In Step 216, the results of the aforementioned analyses are sent to an entity tasked with managing a thermal environment. In one or more embodiments, the results include a computing device identifier of the computing device for each predicted thermal status, the predicted thermal status, the confidence value assigned to the prediction, and the one or more thermal data items predicted to potentially contribute to the future thermal status.

In one or more embodiments, the results may be provided to an administrator in any way that a collection of data can be presented. For example, the administrator may be provided a table of entries. Such a table may include a listing of each computing device predicted to have a high temperature, ranked according to the confidence level of the prediction, with each entry including a listing of the thermal data items assessed to be possible contributing factors to the predicted future thermal status. In one or more embodiments, such a table may be presented to an administrator as part of a GUI used by the administrator to manage one or more thermal environments.

In one or more embodiments, providing the results to an administrator allows the administrator an opportunity to take remedial actions. For example, an administrator may assess that the predicted high temperature computing devices with the highest confidence level (i.e., the predicted failure at the top of the ranking) requires remedial action to mitigate the predicted high temperature. In such an example, the variable likely to contribute to the future failure may be computing device has a consistently high workload, leading to consistently high processor temperature readings. The administrator may also be aware that the computing device is at the top of a rack in the data center. Accordingly, the administrator may make a decision to reorganize the data center, or at least that rack, to move the computing device to a location closer to the floor, which is cooler. As another example, the administrator may decide to relocate the workload to a similar computing device that is ranked highly on the list of devices predicted to have a low temperature. As another example, the administrator may deploy additional cooling solutions to cool the computing device, and/or alter the existing cooling solution.

Figure 3:
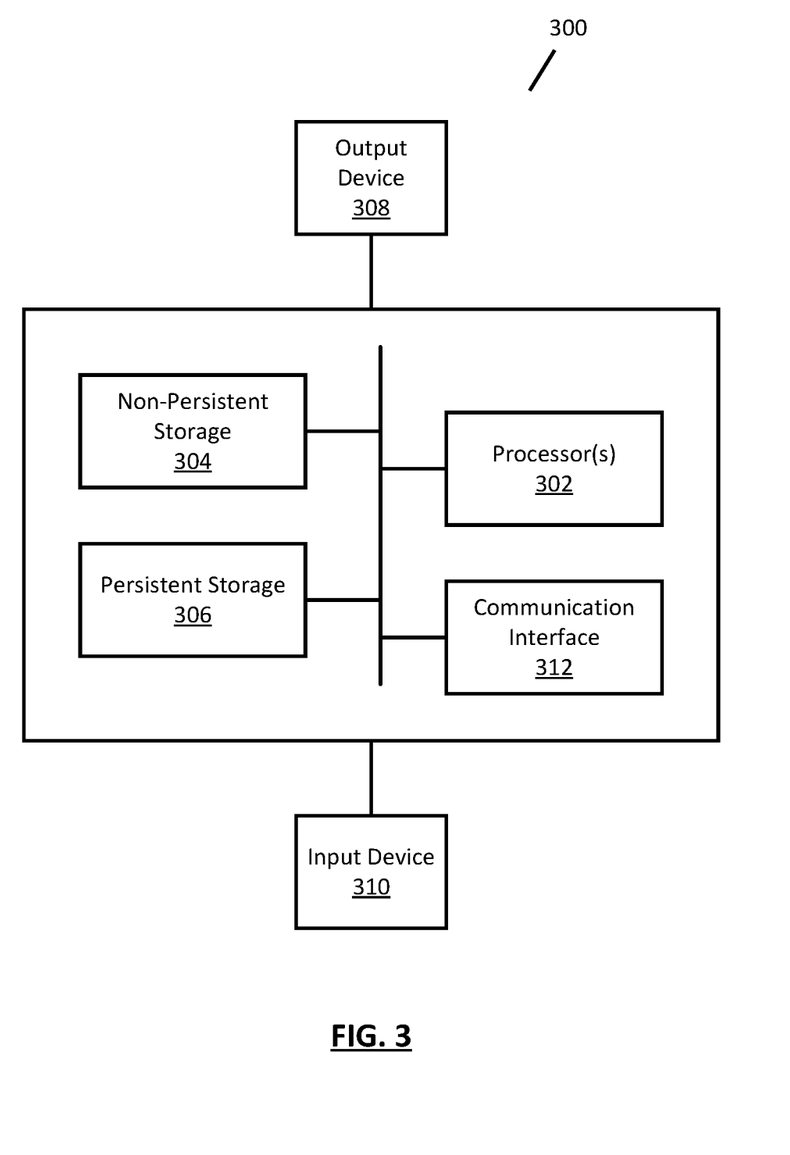
FIG. 3 shows a computing system in accordance with one or more embodiments of the invention.

As discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

The problems discussed above should be understood as being examples of problems solved by embodiments of the invention of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for thermal management of a thermal environment, the method comprising:
obtaining a plurality of thermal data items associated with a plurality of computing devices in the thermal environment;
writing a plurality of entries in a time series database, the plurality of entries comprising the plurality of thermal data items;

performing a time series analysis to predict a plurality of predicted future thermal values based on the plurality of entries in the time series database;

performing a clustering analysis using the plurality of predicted future thermal values to apply a first cluster label to a first portion of the plurality of computing devices and a second cluster label to a second portion of the plurality of computing devices, wherein the clustering analysis comprises a hierarchical density-based spatial clustering of applications with noise technique to organize the plurality of computing devices into a first cluster and a second cluster;

performing a thermal prediction analysis using the first cluster label, the second cluster label, and the plurality of predicted future thermal values to assign a thermal status label to each of the plurality of computing devices, wherein the thermal status label is one selected from a group consisting of high and low;

performing a confidence analysis to determine a confidence value for the thermal status label assigned to each of the plurality of computing devices;

ranking the plurality of computing devices based on the confidence analysis to obtain a ranked thermal status list;

performing a cause analysis to determine at least one thermal data item contributing to each thermal status label assigned to the plurality of computing devices; and providing, via a graphical user interface, the ranked thermal status list and results of the cause analysis to an administrator of the thermal environment, wherein, in response to receiving the ranked thermal status list and the results, the administrator initiates a remedial action.

2. The method of claim 1, wherein, before ranking the plurality of computing devices based on the confidence analysis to obtain the ranked thermal status list, at least one thermal status label for a computing device of the plurality of computing devices is discarded for having the confidence value below a confidence value threshold.

3. The method of claim 1, wherein the plurality of entries in the time series database comprises a chronological series of a plurality of portions of the plurality of thermal data items for each of the plurality of computing devices.

4. The method of claim 1, wherein the thermal prediction analysis comprises using a Mondrian forest classifier.

5. The method of claim 1, wherein the confidence analysis comprises using a transductive confidence machine.

6. The method of claim 5, wherein the cause analysis comprises using an exchangeability test and the plurality of thermal data items.

7. The method of claim 6, wherein the exchangeability test comprises an analysis using martingales.

8. The method of claim 6, wherein, when the cause analysis yields a cause result over a threshold, the at least one thermal data item is selected.

9. The method of claim 1, wherein the results comprise a computing device identifier, the thermal status label predicted for a computing device having the computing device identifier, a rank of the computing device among the plurality of computing devices, and the at least one thermal data item.

10. A non-transitory computer readable medium comprising computer readable program code, which when executed by a computer processor enables the computer processor to perform a method for thermal management of a thermal environment, the method comprising:

obtaining a plurality of thermal data items associated with a plurality of computing devices in the thermal environment;

writing a plurality of entries in a time series database, the plurality of entries comprising the plurality of thermal data items;

performing a time series analysis to predict a plurality of predicted future thermal values based on the plurality of entries in the time series database;

performing a clustering analysis using the plurality of predicted future thermal values to apply a first cluster label to a first portion of the plurality of computing devices and a second cluster label to a second portion of the plurality of computing devices, wherein the clustering analysis comprises a hierarchical density-based spatial clustering of applications with noise technique to organize the plurality of computing devices into a first cluster and a second cluster;

performing a thermal prediction analysis using the first cluster label, the second cluster label, and the plurality of predicted future thermal values to assign a thermal status label to each of the plurality of computing devices, wherein the thermal status label is one selected from a group consisting of high and low;

performing a confidence analysis to determine a confidence value for the thermal status label assigned to each of the plurality of computing devices;

ranking the plurality of computing devices based on the confidence analysis to obtain a ranked thermal status list;

performing a cause analysis to determine at least one thermal data item contributing to each thermal status label assigned to the plurality of computing devices; and providing, via a graphical user interface, the ranked thermal status list and results of the cause analysis to an administrator of the thermal environment, wherein, in response to receiving the ranked thermal status list and the results, the administrator initiates a remedial action.

11. The non-transitory computer readable medium of claim 10, wherein, before ranking the plurality of computing devices based on the confidence analysis to obtain the ranked thermal status list, at least one thermal status label for a computing device of the plurality of computing devices is discarded for having the confidence value below a confidence value threshold.

12. The non-transitory computer readable medium of claim 10, wherein the plurality of entries in the time series database comprises a chronological series of a plurality of portions of the plurality of thermal data items for each of the plurality of computing devices.

13. The non-transitory computer readable medium of claim 10, wherein the thermal prediction analysis comprises using a Mondrian forest classifier.

14. The non-transitory computer readable medium of claim 10, wherein the confidence analysis comprises using a transductive confidence machine.

15. The non-transitory computer readable medium of claim 14, wherein the cause analysis comprises using an exchangeability test and the plurality of thermal data items, and wherein the exchangeability test comprises an analysis using martingales.

16. The non-transitory computer readable medium of claim 10, wherein, when the cause analysis yields a cause result over a threshold, the at least one thermal data item is selected.

17. The non-transitory computer readable medium of claim 10, wherein the results comprise a computing device identifier, the thermal status label predicted for a computing device having the computing device identifier, a rank of the computing device among the plurality of computing devices, and the at least one thermal data item.

18. A system for thermal management of a thermal environment, the system comprising:
a thermal data collector, comprising circuitry, and configured to:
obtain a plurality of thermal data items associated with a plurality of computing devices in the thermal environment; and
write a plurality of entries in a time series database, the plurality of entries comprising the plurality of thermal data items;
a thermal forecaster, comprising circuitry, and configured to perform a time series analysis to predict a plurality of predicted future thermal values based on the plurality of entries in the time series database;
a cluster generator, comprising circuitry, and configured to perform a clustering analysis using the plurality of predicted future thermal values to apply a first cluster label to a first portion of the plurality of computing devices and a second cluster label to a second portion of the plurality of computing devices, wherein the clustering analysis comprises a hierarchical density-based spatial clustering of applications with noise technique to organize the plurality of computing devices into a first cluster and a second cluster;
a status predictor, comprising circuitry, and configured to perform a thermal prediction analysis using the first cluster label, the second cluster label, and the plurality of predicted future thermal values to assign a thermal status label to each of the plurality of computing devices, wherein the thermal status label is one selected from a group consisting of high and low;
a confidence analyzer, comprising circuitry, and configured to perform a confidence analysis to determine a confidence value for the thermal status label assigned to each of the plurality of computing devices;
a parameter predictor, comprising circuitry, and configured to perform a cause analysis to determine at least one thermal data item contributing to each thermal status label assigned to the plurality of computing devices; and
a thermal results analysis transmitter, comprising circuitry, and configured to:
rank the plurality of computing devices based on the confidence analysis to obtain a ranked thermal status list; and
provide, via a graphical user interface, the ranked thermal status list and results of the cause analysis to an administrator of the thermal environment, wherein, in response to receiving the ranked thermal status list and the results, the administrator initiates a remedial action.

\* \* \* \* \*